March 10, 1953  R. W. GOBLE  2,631,270
METHOD OF AND APPARATUS FOR THE MEASUREMENT OF DISTANCE
OR TIME INTERVAL BY THE USE OF COMPRESSIONAL
WAVES IN THE SO-CALLED SUPERSONIC RANGE
Filed May 19, 1947  4 Sheets-Sheet 1

Inventor
Ralph W. Goble

By Joe E. Edwards
Attorney

March 10, 1953  R. W. GOBLE  2,631,270
METHOD OF AND APPARATUS FOR THE MEASUREMENT OF DISTANCE
OR TIME INTERVAL BY THE USE OF COMPRESSIONAL
WAVES IN THE SO-CALLED SUPERSONIC RANGE
Filed May 19, 1947  4 Sheets-Sheet 2

Inventor
Ralph W. Goble
By Jos E. Edwards
Attorney

March 10, 1953  R. W. GOBLE  2,631,270
METHOD OF AND APPARATUS FOR THE MEASUREMENT OF DISTANCE
OR TIME INTERVAL BY THE USE OF COMPRESSIONAL
WAVES IN THE SO-CALLED SUPERSONIC RANGE
Filed May 19, 1947  4 Sheets-Sheet 3

Inventor
Ralph W. Goble

March 10, 1953        R. W. GOBLE        2,631,270
METHOD OF AND APPARATUS FOR THE MEASUREMENT OF DISTANCE
OR TIME INTERVAL BY THE USE OF COMPRESSIONAL
WAVES IN THE SO-CALLED SUPERSONIC RANGE
Filed May 19, 1947        4 Sheets-Sheet 4

Inventor
Ralph W. Goble

By Jod E. Edwards

Attorney

Patented Mar. 10, 1953

2,631,270

UNITED STATES PATENT OFFICE 2,631,270

METHOD OF AND APPARATUS FOR THE MEASUREMENT OF DISTANCE OR TIME INTERVAL BY THE USE OF COMPRESSIONAL WAVES IN THE SO-CALLED SUPERSONIC RANGE

Ralph W. Goble, Long Beach, Calif., assignor to Eastman Oil Well Survey Company, Denver, Colo., a corporation of Delaware Application May 19, 1947, Serial No. 749,030

5 Claims. (Cl. 340—1)

This invention relates to new and useful improvements in methods of and apparatus for the measurement of distance or time interval by the use of compressional waves in the so-called supersonic range.

The invention relates particularly to methods and apparatus primarily adapted for use in measuring the diameter or cross-sectional area of a well bore but which may be employed for other purposes, such as determining the thickness of pipe, cement or other articles present in said bore or locating the position of pipe or materials within the bore.

One object of the invention is to provide an improved method of and means for measuring distances and time intervals whereby well bore diameters may be determined or the position and area of material within said well bore may be ascertained; the results being accomplished without the use of mechanical measuring elements or feelers or expanding arms whereby the measuring capacity of the device is substantially unlimited and the inherent disadvantages of mechanical elements or arms are obviated.

An important object of the invention is to provide an improved measuring method which is particularly useful in measuring well bore diameters and which involves the transmission and reception of sound waves of high frequency in the so-called supersonic range, together with a measurement of the time difference or interval between the transmission of said waves and the reception of the associated echo or reflected waves; such time difference or interval being representative or indicative of the distance between the point of transmission and the point of reflection of said waves, whereby said distance may be accurately measured and determined.

A particular object of the invention is to provide an improved measuring method which consists in transmitting and sending out high frequency vibrations into a well bore and determining the time interval required for the vibrations, which are reflected from the wall of said well bore, to arrive at the point of transmission, whereby an accurate determination of well bore diameter may be made; the method being primarily useful in accurately measuring relatively small distances such as are encountered in well bores.

Still another object of the invention is to provide an improved measuring apparatus, of the character described, wherein a measuring assembly is adapted to be lowered through a well bore and continuously operated to transmit and receive high frequency sound wave trains, together with means for measuring the time interval between the transmitted and received reflected wave; said apparatus also including means at the surface for visibly recording the measurements made by said measuring assembly as it is lowered through the well bore, whereby a continuous visible indication of the well bore diameter is produced.

A further object of the invention is to provide an improved apparatus, of the character described, wherein a sending and receiving crystal or transcender which is lowered through the well bore is utilized to transmit direct high frequency sound waves and to receive the echo or reflected waves, with said transcender being rotated at a predetermined speed so as to continuously scan the surface from which the waves are reflected; the speed of rotation of the transcender being synchronized with the circular sweep of an indicator at the surface, whereby the pattern obtained on said indicator provides a visual indication of the measurement being made.

Another object of the invention is to provide an improved measuring assembly for an apparatus of the character described, which assembly is adapted to be lowered within a well bore and which assembly includes a rotating sending and receiving crystal, together with a driving oscillator, the latter being actuated at the frequency at which the crystal is adapted to operate, whereby maximum efficiency or output of said crystal is assured.

A specific object of the invention is to provide an improved apparatus, of the character described, which is capable of accurately measuring small distances within a range extending from fractions of an inch to several feet and which is so constructed that a plurality of indicators, one of which may be of the permanent record type, may be simultaneously operated to visually record and indicate the measurements being made.

The construction designed to carry out the invention will be hereinafter described together with other features of the invention.

The invention will be more readily understood from a reading of the following specification and by reference to the accompanying drawing, wherein an example of the invention is shown, and wherein.

Figures 1, 10, 11:
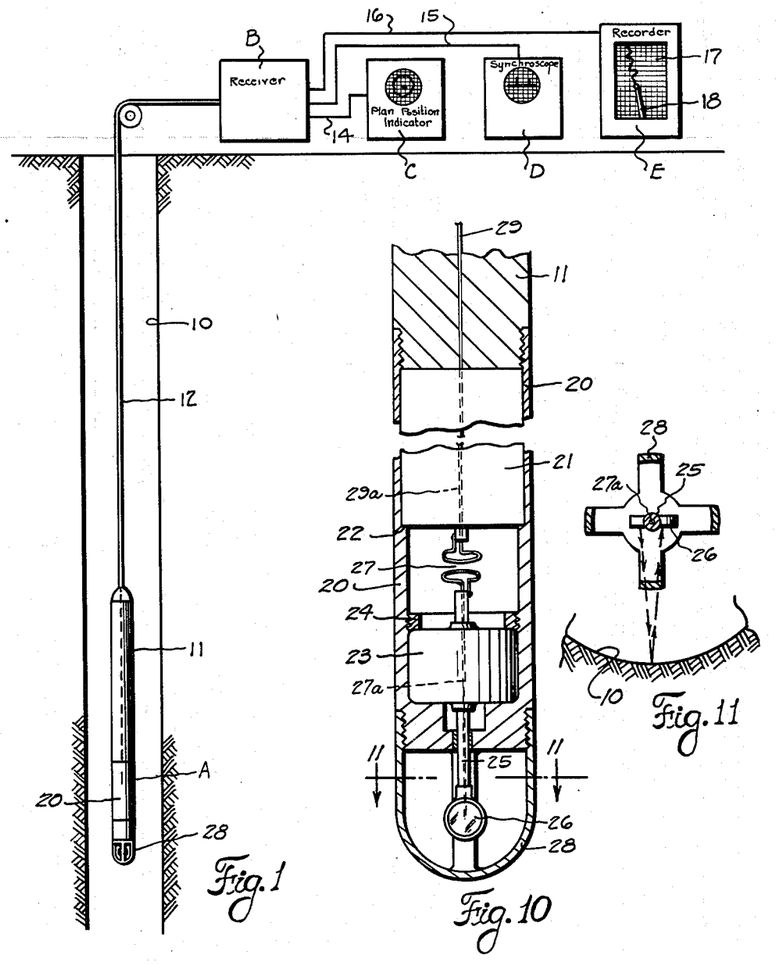
Figure 1 is a schematic view of a well bore illustrating the improved apparatus for practicing the method, with the measuring assembly lowered within said bore and the receiving and indicating units located at the surface.
Figure 10 is an enlarged, transverse, vertical sectional view of the lower portion of the measuring assembly.
Figure 11 is a horizontal, cross-sectional view, taken on the line 11—11 of Figure 10.

In the drawings, the numeral 10 designates a well bore which extends downwardly through the sub-surface strata from the ground surface. A transmitting assembly A, which will be hereinafter described in detail, is arranged to be lowered within the well bore and said assembly is connected to the lower end of a sinker or lowering bar 11. The sinker bar is attached to the lower end of a conductor cable 12 and said cable functions to suspend or support the transmitting assembly and at the same time provides an electrical connection between said assembly and the surface equipment. The cable extends upwardly to the surface and passes over a suitable pulley 13 in the derrick (not shown) and has electrical connection with a receiver B. The receiver B has electrical connection through conductors 14, 15 and 16 with a plan position indicator C, a synchroscope or auxiliary oscilloscope D and a recorder E, respectively. The plan position indicator, synchroscope and recorder are units of standard construction and the latter includes a movable tape or chart 17 which is adapted to be traversed by a marking stylus 18. The stylus is electrically controlled in accordance with the operation of the transmitting assembly A and receiver B, as will be explained, and functions to form a permanent record of the particular measurement which is being made.

The assembly A which is arranged to be lowered within the well bore 10 includes a tubular casing or housing 20 which has its upper end attached to the sinker bar 11. A transmitter 21, the electrical circuit of which will be hereinafter described in detail, is mounted within the tubular casing or housing 20, being supported therein upon a suitable internal annular shoulder 22. An electric motor 23 is mounted within the lower end of the housing 20 and is maintained in position by a retaining ring 24. The shaft 25 of the motor extends downwardly from the housing and has a sending and receiving crystal or transcender 26 secured to its lower end. The electric motor 23 is coupled to the transmitter through an inductive coupling 27 and obviously with this arrangement the parts are electrically connected while permitting the motor shaft and the crystal secured thereto to rotate with respect to the stationary transmitter. A suitable protective element or guard 28 is threaded onto the lower end of the casing or housing and protects the crystal 26 from damage as the assembly is raised or lowered within the well.

An electrical connection between the crystal 26 and the inductive coupling 27 is made through a wire 27a. A conductor or wire 29a provides an electrical connection between the coupling 27 and the transmitter, while a conductor 29 extends from the transmitter and forms part of the cable 12 which extends to the surface equipment. As is the usual practice, the outer sheath of the cable forms the ground side of the circuit. Assuming that well bore diameter is to be measured, the transmitter 21 is operated and this will initiate actuation of the rotating crystal or transcender 26, whereby high frequency sound waves in the so-called supersonic range will be generated and transmitted outwardly from the crystal. The operating frequency is subject to some variation but it has been found that satisfactory results have been obtained in the range from 500 kc. to 1 megacycle. As indicated by the dotted lines in Figure 11, the transmitted waves will travel outwardly into contact with the wall of the well bore 10 and upon striking said wall will be reflected back to the crystal or transcender 26 to vibrate the crystal. This vibration caused by the reflected waves will generate a voltage and this voltage is conducted to the surface equipment. At the time that the transmitter is operated to actuate the crystal and transmit the sound waves, a signal is conducted to the surface equipment and this transmitted impulse will appear on the screen of the plan position indicator C as well as upon the screen of the auxiliary synchroscope D.

It is noted that the usual well bore has a fluid, such as drilling mud or the well fluids therein at all times and obviously the transmitting assembly is lowered within such fluids. It is the fluid which is present within the well bore which provides the medium through which the sound vibrations or waves are readily propagated both as to the direct, as well as the reflected or echo waves.

As the reflected or echo waves are received by the crystal 26, the voltage generated by the received waves is conducted upwardly to the surface through the conductor 29 and this reflected or echo wave becomes apparent upon the screen of the plan position indicator C and the screen of the auxiliary synchroscope D. As will appear later, the recorder E is actuated in accordance with the transmitted and received waves and its stylus 18 is movable to indicate upon the chart the actual diameter of the well bore. Actually, all of the indicators C, D and E provide similar information with respect to the well bore diameter.

The circular sweep of the plan position indicator C is controlled and synchronized to the same speed of rotation as the crystal 26 and, therefore, the pattern which appears upon the screen of said plan position indicator will be substantially a cross-sectional view of the area of the well bore. Proper calibration of the screen of the indicator C will make it possible to determine the exact diameter and contour in cross-section of the well bore.

The auxiliary synchroscope D indicates the instant of transmission of the transmitted wave in the form of a positive pip on its screen and indicates the instant of reception of the reflected or echo wave by a second or smaller pip which is, of course, spaced from the first pip. The distance between the two pips which are representative of the transmitted and received waves will indicate the time interval between the time of transmission and the time of reception. By properly calibrating the distance on the screen of the synchroscope D, it is possible to accurately measure the distance between the crystal 26 and the reflecting surface or wall of the well bore at that point of measurement.

At the same time that the transmitted waves and the received or echo waves are indicated on the units C and D, the stylus 18 of the recorder E is actuated to visibly record the diameter as measured by the assembly A. The position of the stylus with respect to its chart 17 is controlled solely in accordance with the time of transmission and the time of reception of the waves. As will be explained, the rotating crystal sends and receives a plurality of waves or wave trains during each revolution and all of the sent and received waves during one revolution are integrated and averaged to actuate the stylus and, therefore, the line formed by the stylus on the chart is representative of the mean diameter of the well bore at the point of measurement. The chart 17, of course, provides a permanent visible record of the well bore diameter.

It is pointed out that it is not essential to the present invention that the three indicating devices C, D and E be employed since obviously any one of said three devices would provide the required information with respect to the diameter of the well bore. However, as illustrated the plan position indicator furnishes a visual indication of the actual cross-section of the well bore, while the synchroscope or auxiliary oscilloscope D provides an indication which may be accurately measured at any time to determine the well bore radius at any given point. The recorder E produces a permanent record of the well bore diameter throughout the length or depth of said bore.

As has been stated, the sending and receiving crystal or transcender 26 rotates at a predetermined speed within the well bore during operation of the apparatus. The frequency of the generated and transmitted sound waves or wave trains is sufficient to prevent inaccurate reading due to the rotating movement of the crystal because the speed of the sound wave transmission or travel, as it moves from the crystal to the wall of the well bore and then back to the crystal, is sufficiently great to permit reception of the reflected wave or wave train before any appreciable angular movement of the crystal has occurred. In other words, the frequency of the transmitted waves is greater than the speed of rotation of the crystal 26 which means that the wave may be transmitted, reflected and received before there is any noticeable change in the radial or angular position of the rotating crystal.

It may occur that the assembly A which has the rotating crystal 26 at its lower end will be suspended off-center or toward one side of the well bore so that the crystal 26 is not exactly centered within said bore. In such instance the pattern which will appear on the plan position indicator C will definitely show that said crystal is off-center because the spot at the center of the screen of said indicator represents the center or axis of the well bore; therefore, if the scanning beam which forms the circle representative of the well bore is eccentric to the center spot, this will indicate that the assembly A is not axially centered within the bore. The auxiliary synchroscope D will give further indication of any off-center position because the distance between the positive pips on this scope are representative of the distance between the crystal 26 and the wall of the well bore at the instant of measurement. It will be obvious that if the distance between the pips remains the same throughout one revolution of the crystal 26, then said crystal is in the center of the bore. However, if the distance between the pips on the screen of the synchroscope constantly varies during one revolution of the crystal, this indicates that the distance between the crystal and the wall of the well bore is not the same during the one revolution of said crystal and thus advises the operator that the crystal is off-center.

With respect to the recorder, it has been stated that it is necessary that the indication as recorded by the moving stylus 18 be an average of the distances measured during one revolution of the rotating crystal. This will assure that the record appearing on the chart 17 will accurately indicate the mean well bore diameter, irrespective of the position of the crystal with relation to the center of the well bore.

Figures 12, 13, 14, 15, 16, 17, 18:
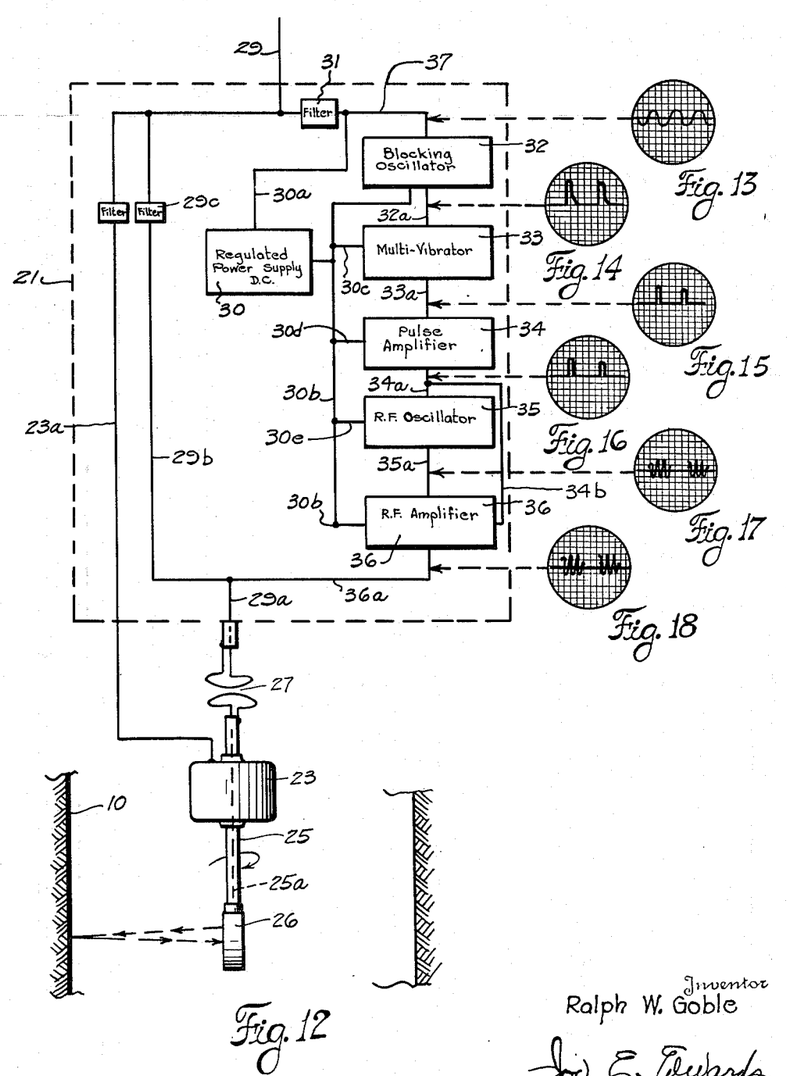
Figure 12 is a wiring diagram of the transmitter and transcender.
Figures 13 to 18 are face views of an oscilloscope screen illustrating the wave form of the electrical current and impulses at various points in the transmitter circuit.

The transmitter 21 which is employed is subject to some variation and one form of transmitter which may be used is illustrated in Figure 12. This transmitter includes a regulated D. C. power supply 30 which is connected by means of a lead-in wire 30a with the conductor 29. A suitable filter 31 is connected between the line 30a and the conductor. Alternating current is conducted downwardly from the surface and through conductor 29 and lead-in wire 30a to the power supply 30. The power supply unit furnishes power to a blocking oscillator 32, a multi-vibrator 33, a pulse amplifier 34, a radio frequency oscillator 35 and a radio frequency amplifier 36, the electrical connections being made through a common conductor 30b and branch conductors 30c, 30d and 30e. All of the elements 32 to 36, inclusive, form a part of the transmitter circuit. A conductor or wire 37 electrically connects the alternating current lead-in wire 29 with the blocking oscillator 32, whereby when the alternating current from the surface flows to the transmitter, the blocking oscillator 32 is immediately set into operation. It will be evident that since the alternating current is simultaneously conducted to the blocking oscillator, said current functions to synchronize the blocking oscillator to the frequency of the alternating current.

Actuation of the blocking oscillator 32 generates electrical pulses which appear as shown in the oscilloscope screen pattern in Figure 14 and these pulses are conducted through a wire 32a to the multi-vibrator 33, wherein said pulses are shaped and the lengths thereof controlled. As the pulses are conducted from the multi-vibrator 33 through a conductor 33a to the pulse amplifier 34, they appear as shown on the oscilloscope screen in Figure 15. The pulse amplifier 34 has connection through a conductor 34a with the radio frequency oscillator 35 and the amplified pulses, having the pattern shown on the oscilloscope screen in Figure 16, function to actuate said radio frequency oscillator and thereby generate a wave train which has the form shown on the oscilloscope screen in Figure 17. The wave trains are conducted through a wire 35a through the radio frequency amplifier 36 where they are amplified and then conducted through the wire 36a which connects to the wire 29a of the transmitter. The pattern of the amplified wave trains is illustrated in Figure 18.

As explained, the wire 29a is electrically connected to the conductor 25a which extends to the crystal 26, such connection being through the inductive coupling 27.

A wire 34b has one end connected to the conductor 34a which leads from the pulse amplifier and has its opposite end connected to the radio frequency amplifier 36, whereby the amplified pulse flowing from the pulse amplifier 34 to the radio frequency oscillator 35 is utilized to gate the radio frequency amplifier. Thus, the radio frequency amplifier is not in operation and does not draw power during the intervals when pulses are not being generated. This shut-off of the radio frequency amplifier also prevents said amplifier from absorbing any power or voltage which will be present in the conductor 29a when the crystal 26 or transcender is vibrated by the reflected or echo wave.

The wave train which is conducted to the crystal 26 will impart a vibration to said crystal so that a sound wave train of high frequency, in the so-called supersonic range, is generated and propagated outwardly from the crystal in a relatively narrow beam. As indicated by the arrows in Figure 12, the generated wave train will travel outwardly through the fluid medium within said bore to the wall of the well bore and upon striking said wall, will be reflected back to the crystal 26. Although the crystal is rotating, the speed of travel of the wave train to the wall of the bore and back to the crystal is so much greater than the speed of rotation of the crystal that any angular movement of the head between the sending and the reception of the wave will not be noticeable. It is noted that the duration of the transmitted wave train is less than the time required for the reflection of the wave train in ascertaining the shortest distance which is to be measured by the apparatus, and thus the transmitter is shut off at the instant that the echo or reflected wave is received.

As the reflected or echo wave train is received by the crystal 26, said crystal is vibrated to generate a voltage and this voltage is conducted upwardly through the conductor 25, coupling 27 and conductor 29a. From the conductor 29a a connecting wire 29b carries this voltage to the conductor 29 and thence upwardly to the surface equipment. It is noted that at the time of transmission, that is, when the wave train generated by the radio frequency oscillator was conducted downwardly to the crystal, this same wave train flowed upwardly through the line 29b and conductor 29 to the surface. Thus, both the transmitted and reflected or echo wave trains are conducted upwardly through the conductor 29 to the surface equipment. A suitable filter 29c is connected in the line 29b to block flow of alternating current from the conductor downwardly in said line. The necessary current for actuating the motor 23 is supplied through a wire 23a which extends from the motor and is connected to the conductor 29 which conducts alternating current downwardly to the transmitter.

From the foregoing it will be apparent that alternating current is supplied from the surface to the transmitter 21. Operation of the transmitter results in the generation of wave trains which are conducted to the crystal 26 to actuate said crystal and generate high frequency sound waves which travel outwardly in the well bore. At the same time that the crystal is actuated, a signal is conducted to the surface equipment to provide information as to the instant of transmission of the sound wave. The reflected or echo wave striking the crystal is also transmitted to the surface and through the surface equipment, the time interval between the instant of transmission and the instant of reception is measured to give information as to the distance travelled by the sound waves.

Figures 2, 3, 4, 5, 6, 7, 8, 9:
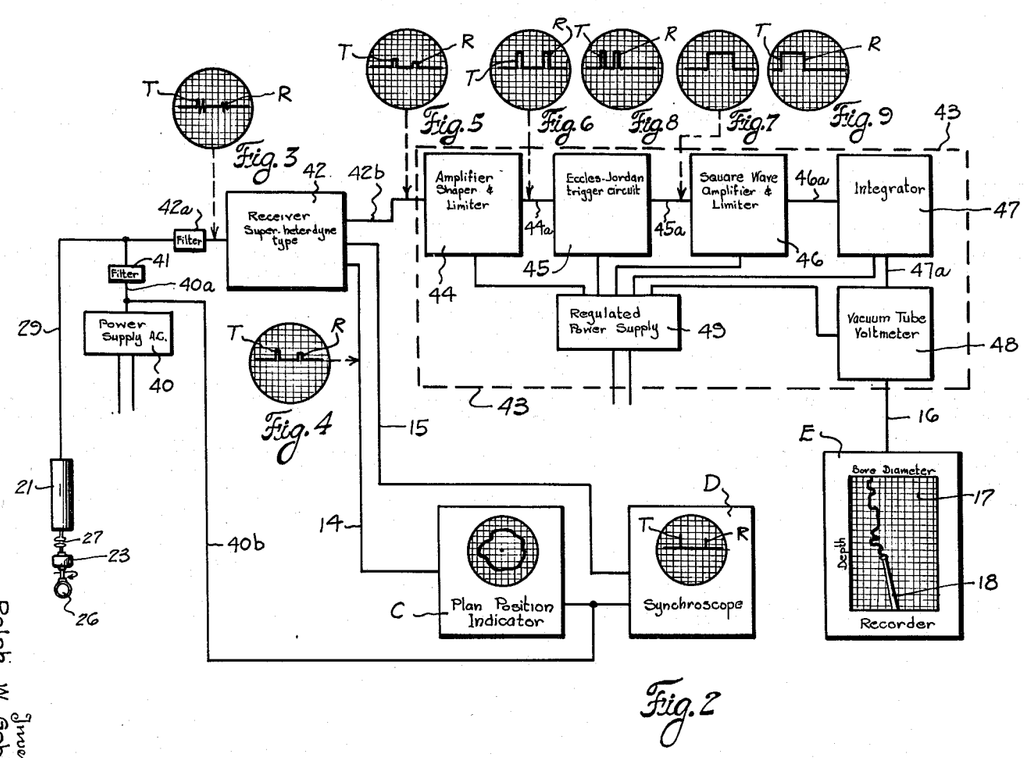
Figure 2 is a block diagram of an apparatus, constructed in accordance with the invention.
Figures 3 to 9 are face views of an oscilloscope screen, illustrating the wave forms of the transmitted and received electrical impulses at various points or stages in the electrical circuit.

The surface equipment which is employed in this apparatus is illustrated in Figure 2 and as shown therein, the alternating current for actuating the transmitter 21 is provided from a suitable power supply 40. This power supply has connection through a wire 40a with the conductor 29 which leads downwardly to the transmitter 21. A suitable filter 41 is connected in the line 40a to prevent the current which is conducted to the surface from becoming dissipated in the power supply. The conductor 29 is connected to a receiving unit 42 which forms part of the receiver B and a suitable filter 42a is interposed between the unit 42 and the point of connection of the line 40a, whereby the alternating current from the supply 40 is blocked from the unit and cannot affect the same.

The transmitted wave train and the reflected or echo wave train flow from the conductor 29 within the cable 12 and just prior to their entry into the receiving unit 42 they appear as shown on the oscilloscope screen in Figure 3, the transmitted wave train being indicated by the letter T and the reflected wave train being indicated by the letter R.

The receiving unit 42 is of the super-heterodyne type and may be a wide band amplifier, similar to the 30 and 60 megacycle strips manufactured by the Sylvania Corporation. The unit 42 functions to amplify and rectify the wave trains and gives them the patterns as shown in the oscilloscope screen of Figure 5. This pattern causes the transmitted and received wave trains to appear as positive pips and the auxiliary synchroscope D is directly connected through the wire 15 with the receiving unit, whereby this type of indication is produced on the screen of said synchroscope. As has been stated, the distance between the pip representing the transmitted wave train and the pip representing the reflected received wave train is representative of the distance between the crystal 26 and the wall of the well bore. If the sending and receiving crystal is exactly centered within the bore, this distance would be an indication of the radius of said bore.

The receiving unit 42 is connected through the wire 14 with the plan position indicator C which as has been stated, is a standard unit which may be purchased on the open market. The circular sweep of the plan position indicator is controlled and timed by the alternating current which is employed to actuate the transmitter 21. The alternating current is supplied to the plan position indicator through a wire 40b which extends from the alternating current supply wire 40a to said indicator. By timing the sweep of the plan position indicator C by means of the alternating current which actuates the motor 23 of the rotating crystal 26, said sweep is synchronized with the speed of rotation of the crystal 26; therefore, the wave trains transmitted and received by the crystal 26 during one revolution thereof will appear in a circular pattern upon the screen of the plan position indicator. Because of the persistence of vision, the pattern will appear on the screen as a substantially circular line which will be a cross-sectional view of the wall surface of the well bore under investigation.

From the foregoing it will be seen that a visible indication is given by the plan position indicator C which provides information as to the particular cross-sectional shape of the well bore. At the same time, the auxiliary synchroscope D provides a visual indication of the distance between the crystal 26 and the wall of the bore at any given instant. It will be evident that if the rotation of the crystal were halted at any given time, the synchroscope indication permits an accurate measurement of the distance between the crystal and the wall of the bore at that point to be made.

In addition to the two concurrent indications provided by the plan position indicator C and the auxiliary synchroscope D, the recorder E has been provided so as to produce a permanent record of the well bore diameter. The recorder E includes the chart 17 which may be driven by a suitable timing motor so as to represent depth or elevation and the marking stylus 18 is movable transversely across said chart. The timing motor drives the chart at a rate correlated to the rate of lowering of the assembly A and thus the indications on the chart are correlated to depth. The transmitted wave trains and the reflected or echo wave trains are conducted from the receiving unit 42 through a wire 42b to a counter circuit 43 which is also part of the receiver B. This counter circuit includes an amplifier, shaper and limiter unit 44 which is connected by a wire 44a with an Eccles-Jordan trigger circuit 45. The trigger circuit has connection through a wire 45a with the square wave amplifier and limiter 46 and the latter is connected through a conductor 46a with an integrator 47. The integrator is connected through wire 47a with a vacuum tube voltmeter 48 and the voltmeter has direct connection with the recorder E through the wire 16. A regulated power supply 49 furnishes power through suitable conductors to the units 45 to 48, inclusive. This counter circuit may form a part of the receiver B illustrated in Figure 1 and the wire 16 leading from said receiver is the connection between the vacuum tube voltmeter 48 and the recorder E.

As the transmitted and received wave trains flow from the receiver 42, they have the pulse pattern shown in Figure 5, the receiver having converted said trains into this pattern. The wave trains or pulses then flow through the amplifier shaper and limiter and assume the pattern shown in Figure 6 before passing to the trigger circuit 45. The trigger circuit 45 functions to convert the pulses into a square wave, as illustrated in Figure 7, and this square wave is conducted to the amplifier and limits the form of said wave. The flow is then through the integrator 45 which has a condenser and resistance arrangement, wherein the resistance controls the discharge rate of the condenser. With this arrangement the pulses which are transmitted and received during one revolution of the crystal 26 are utilized to charge the condenser and through the control of the discharge rate of said condenser by the resistance, all of the sent and received pulses during one revolution are averaged so that the amplitude or voltage which is conducted to the voltmeter 48 through the line 47a is an average or mean amplitude or voltage of the amplitudes produced by all of the pulses which are sent and received during one revolution of said crystal. Manifestly, the average amplitude or voltage, which is dependent upon the particular square waves produced during one revolution of the crystal is conducted to the vacuum tube voltmeter 48.

It is apparent that the amplitude or voltage is in direct ratio or proportion to the distances between the transmitted wave trains or pulses and the received or echo wave trains or pulses which are sent and received during one revolution of the crystal and is therefore an average of the distance between the wave trains or pulses sent out and received during one revolution of the crystal 26. This average voltage or amplitude is utilized to operate the vacuum tube voltmeter which as has been explained is directly connected through the wire 16 with the recorder E. As is well known, the voltmeter operates on a differential of voltage applied thereto and as the average amplitude or voltage applied to the voltmeter upon each revolution of the crystal varies due to variation in the diameter of the well bore under measurement, the movement of the stylus is variable in direct proportion thereto. The chart 17 is properly calibrated in distance and is movable by a suitable timer (not shown) at a rate correlated to the rate of lowering of the assembly A and thus, the movement of the stylus across the chart is an indication of the measurement of the average well bore diameter or cross-sectional area. It is obvious that the chart provides a continuous record of the spacing between the crystal and the wall of the well bore throughout each revolution of the crystal so that a continuous record of the average well bore diameter or cross-sectional area is produced.

In the operation of the apparatus, the assembly A is lowered at a constant predetermined speed through the well bore 10 and the transmitter 21 and rotating crystal 26 are continuously operated. The speed of lowering of the assembly is synchronized with the speed of movement of the recording chart 17 of the recorder E. As the transmitter generates each wave train, the crystal 23 is vibrated to generate and transmit a sound wave train of high frequency in the so-called supersonic range and at the same instant that the wave train is generated and transmitted by the crystal, a signal is conducted to the surface equipment and becomes apparent on the screens of the plan position indicator C and the auxiliary synchroscope D.

The wave train generated by the crystal 26 travels radially outwardly therefrom and strikes the wall of the well bore and is immediately reflected back and is received by said crystal. As has been noted, the time interval of transmission is such that transmission is shut-off prior to the reception of the reflected or echo wave and thus, the crystal alternately sends and receives the wave trains. The reception of the reflected or echo wave train is then conducted to the surface and also appears on the screens of the plan position indicator C and the auxiliary synchroscope D. The frequency of the transmitted wave trains is so much faster than the speed of rotation of the crystal 26 that each wave train is sent and received by the crystal before said crystal has rotated any appreciable or noticeable amount. As the crystal rotates, the successive intermittent transmitted wave trains scan the entire wall surface of the well bore. As has been stated, the synchroscope D provides an indication of the actual distance between the crystal and the reflecting wall surface at any given instant. The plan position indicator, because of the fact that its circular sweep is synchronized to the speed of rotation of the crystal, provides an indication of the cross-sectional shape of the well bore.

In addition to the two visual indications which are produced by the plan position indicator C and the auxiliary synchroscope D, the recorder E is included in the apparatus. This recorder has its stylus 18 actuated in direct proportion to the average distance between the crystal 26 and the wall of the well bore during each revolution of said crystal. The stylus is controlled in its movement by the counter circuit 43 which functions to convert the electrical pulses into amplitude or voltage which is directly proportional to the time interval between the periodic or intermittent sent and the received waves. As has been explained, the counter circuit functions to average all of the distances measured during one revolution of the crystal and this average is transposed into amplitude or voltage which operates the stylus 18. Therefore, as the stylus moves over the chart 17 it provides a permanent record or indication of the average diameter or cross-sectional area of the well bore.

It has been noted that the invention is not to be limited to the use of the three indicating or recording means C, D and E for obviously any one or all of these units may be employed.

Figure 20:
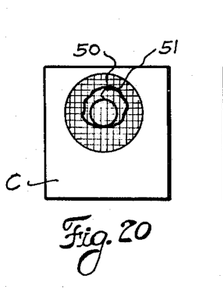
Figure 20 is a face view of an oscilloscope screen illustrating the indication which is produced when the apparatus is employed to check cement thickness within a well bore.

The apparatus has been described as measuring the average diameter or cross-sectional area of a well bore but said apparatus may be employed for other purposes. For example, in many instances it is desirable to determine the thickness of a cement wall which has been placed behind a well casing. By lowering the assembly A into position within a well casing having cement behind the same, a double line reflection or echo would be obtained. The indication received on the plan position indicator C is illustrated in Figure 20, wherein the inner circular line 50 represents the inner wall of the cement and the uneven, generally concentric line 51 indicates the outer wall of said cement. An indication of this character obtained on the plan position indicator would clearly show the thickness of the cement surrounding the casing at any given depth or elevation within the well bore.

Figure 21:
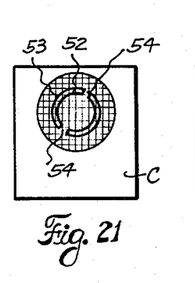
Figure 21 is a view, similar to Figure 20, showing the illustration produced when the apparatus is employed for locating perforation in the well pipe.

The apparatus could also be employed for locating perforations within a well casing and in such instance, an indication on the screen of the plan position indicator C, as shown in Figure 21, would be obtained. In this case the inner wall of the pipe is represented by the line 52 with the outer wall of said pipe being represented by the line 53. At those points where perforations occur breaks 54 in the lines 52 and 53 would appear. The value of this information as to the exact location of perforations is obvious.

Figure 22:
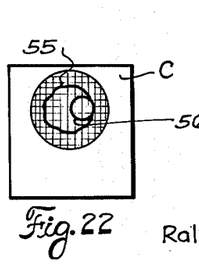
Figure 22 is a view, similar to Figures 20 and 21 of an oscilloscope screen of the indication obtained when the apparatus is employed for locating pipe, junk or other material in the well bore.

Still another use to which the apparatus may be put is illustrated in Figure 22 where the screen of the plan position indicator C provides an indication locating the position of a broken section of pipe within a well bore. In this illustration, the generally circular line 55 is representative of the well bore. The smaller circular indication 56 is representative of the broken section of pipe which is lying to one side of the well bore. This pattern will be produced because of the several reflected or echo waves which would be produced under these conditions. It is evident that many other purposes for the apparatus in measuring distances or locating material within a well bore may be found.

Figure 19:
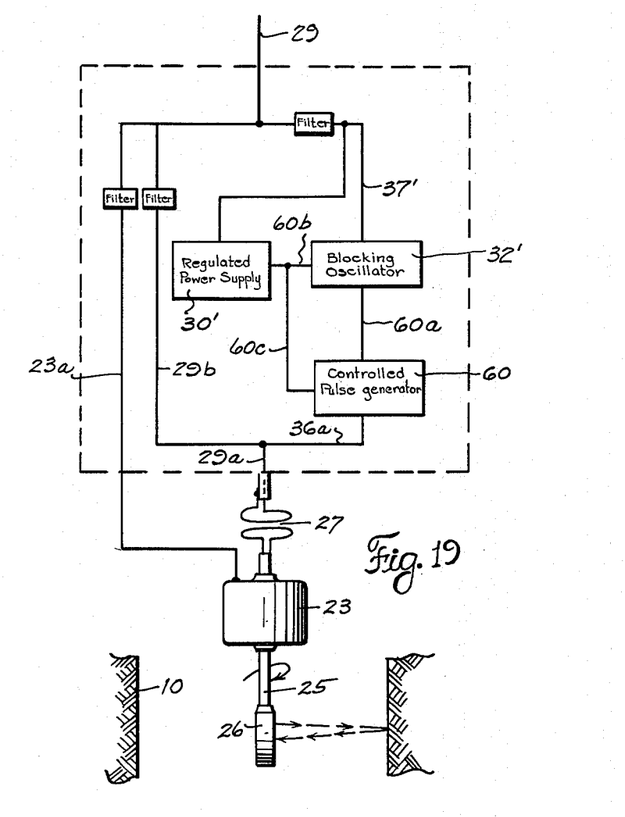
Figure 19 is a block diagram of a modified form of transmitter circuit.

It has been previously pointed out that the particular transmitter which is illustrated in Figure 12 is subject to variation and that other types of transmitters may be employed. In Figure 19, a modified form of transmitter is shown. This circuit includes a blocking oscillator 32' which is connected to the conductor 29 through a wire 37'. In place of the various units 33 to 36 shown in the transmitter of Figure 12, a controlled pulse generator 60 is provided. This generator is connected through a wire 60a with the blocking oscillator 32'. A regulated power supply 30' which has connection with the conductor 29 supplies power to the oscillator 32' and controlled pulse generator 60 through wires 60b and 60c. The pulse generator has connection with the wire 36a and conductor 29a which leads to the crystal and is also connected through wire 29b back to the conductor 29. Power to the motor 23 of the sending and receiving crystal 26 is supplied as in the first form through the wire 23a.

In this modified form of arrangement, the electrical pulses originating in the blocking oscillator circuit and controlled by the pulse generator 60 are utilized to shock excite the crystal 19. This shock excitation generates the high frequency sound waves or wave trains which are propagated outwardly from the crystal 26. The reception of the reflected or echo waves or wave trains by the crystal is carried out in the same manner as has been described with reference to the first form of transmitter. The surface equipment will also be identical to that previously described. It will be evident that the transmitter illustrated in Figure 19 is a simplified type but the basic operation of the apparatus remains the same.

From the above it will be seen that an apparatus capable of accurately measuring extremely small distances is provided. The sound waves or wave trains which are generated are of high frequency and are preferably within the so-called supersonic range which makes possible the accurate measurement of the smaller distances. The surface equipment provides visual indications which are representative of the time interval between the instant of transmission of the waves or wave trains and the instant of reception of the reflected waves or wave trains and it is manifest that by determining this time interval, an accurate determination of actual distance between the sending crystal and the surface from which reflection occurs may be made. The particular type of transmitter is subject to variation and so long as said transmitter generates a pulse capable of operating the crystal at the desired frequency, the purposes of the invention may be accomplished. As has been stated, the apparatus is not to be limited to the use of the three surface indicators since the desired information can be obtained by employing only a single indicating unit at the surface.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An apparatus for determining the cross-sectional area of a well bore including, a transmitting assembly adapted to be lowered within a well bore and having means for continuously transmitting a plurality of series of supersonic wave trains radially outwardly toward the wall of the well bore, said assembly also having means for receiving each wave train after it has been reflected from the wall of the bore or from the surface of an object present in said bore, means for continuously rotating the transmitting assembly to continuously vary the direction of transmission about a point within the well bore, whereby the series of wave trains continuously scan the wall surface of said bore, means electrically connected with the transmitting assembly for determining the time interval between the instant of transmission of each wave train and the instant of reception of the reflected or echo wave train, means at the surface of the well bore electrically connected to the transmitting assembly for transposing the time interval determinations into visual indications of the actual distance between the point of transmission of each wave train and the surface from which said wave train is reflected, and a plan position indicator at the surface of the well bore which is actuated by the transmitted and received wave trains to produce a visual indication of the cross-sectional area of the well bore.

2. An apparatus as set forth in claim 1, wherein the means for transmitting the wave train and means for receiving the reflected or echo wave train is a single crystal element which is electrically coupled to and forms part of the transmitting assembly.

3. An apparatus for determining the cross-sectional area of a well bore including, a transmitter assembly adapted to be lowered through the well bore at a predetermined rate to traverse said bore, said assembly comprising means for generating electrical wave trains at periodic intervals, and a constantly rotating sending and receiving crystal electrically coupled to and actuated by the generating means for continuously transmitting supersonic wave trains outwardly from the crystal in constantly changing radial directions, said crystal also functioning to receive said wave trains after they have been reflected from the wall of the well bore, means electrically connected to the transmitting assembly for determining the time interval between the instant of transmission of each wave train and the reception of that wave train after it has been reflected from the wall of the well bore, means for rotating the sending and receiving crystal at a speed of rotation which is less than the frequency of the transmitted sound wave trains, whereby each wave train may be transmitted, reflected and received before any appreciable change in angular position of said rotating crystal has occurred, and a plan position indicator at the surface of the well bore which is actuated by the transmitted and received wave trains to produce a visual indication of the cross-sectional area of the well bore.

4. An apparatus as set forth in claim 3, wherein the circular sweep of the plan position indicator is controlled and synchronized to the same speed of rotation as that of said crystal, whereby the pattern which appears upon said plan position indicator is substantially a cross-sectional view of the area of the well bore.

5. An apparatus as set forth in claim 1, together with electrical means for averaging the measured time intervals throughout each revolution of the sending and receiving crystal and means for utilizing this average measurement for actuating the means for transposing said measurement into visible indications of distance.

RALPH W. GOBLE.

REFERENCES CITED

The following references are of record in the file of this patent:

UNITED STATES PATENTS

| Number | Name | Date |
|---|---|---|
| 2,121,411 | Schroder | June 21, 1938 |
| 2,156,052 | Cooper | Apr. 25, 1939 |
| 2,190,686 | Slichter | Feb. 20, 1940 |
| 2,251,817 | Athy et al. | Aug. 5, 1941 |
| 2,333,688 | Shepard | Nov. 9, 1943 |
| 2,368,532 | Fearon | Jan. 30, 1945 |
| 2,398,562 | Russell | Apr. 16, 1946 |
| 2,408,458 | Turner, Jr. | Oct. 1, 1946 |
| 2,415,636 | Johnson | Feb. 11, 1947 |
| 2,456,598 | Schuck | Dec. 14, 1948 |
| 2,460,316 | Trent et al. | Feb. 1, 1949 |

FOREIGN PATENTS

| Number | Country | Date |
|---|---|---|
| 546,202 | Great Britain | July 2, 1942 |